(12) United States Patent
Fudemoto et al.

(10) Patent No.: US 10,017,007 B2
(45) Date of Patent: Jul. 10, 2018

(54) TIRE

(71) Applicant: BRIDGESTONE CORPORATION, Chuo-ku, Tokyo (JP)

(72) Inventors: Hiroyuki Fudemoto, Tokyo (JP); Atsuko Honjyo, Tokyo (JP); Tong Gao, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1 day.

(21) Appl. No.: 14/774,132

(22) PCT Filed: Mar. 27, 2014

(86) PCT No.: PCT/JP2014/058981
§ 371 (c)(1),
(2) Date: Sep. 10, 2015

(87) PCT Pub. No.: WO2014/157559
PCT Pub. Date: Oct. 2, 2014

(65) Prior Publication Data
US 2016/0023515 A1    Jan. 28, 2016

(30) Foreign Application Priority Data

Mar. 29, 2013  (JP) ................................ 2013-074297

(51) Int. Cl.
| | | |
|---|---|---|
| *B29D 30/06* | (2006.01) | |
| *B60C 9/22* | (2006.01) | |
| *C08G 69/40* | (2006.01) | |
| *C08G 69/44* | (2006.01) | |
| *B60C 1/00* | (2006.01) | |
| *B60C 5/01* | (2006.01) | |
| *B29D 30/32* | (2006.01) | |

(52) U.S. Cl.
CPC ........ *B60C 1/0041* (2013.01); *B29D 30/0678* (2013.01); *B60C 5/01* (2013.01); *B60C 9/2204* (2013.01); *C08G 69/40* (2013.01); *C08G 69/44* (2013.01); *B29D 2030/3285* (2013.01); *C08G 2380/00* (2013.01)

(58) Field of Classification Search
CPC ........ B29D 30/0678; B29D 2030/3285; B60C 9/2204; B60C 1/0041; B60C 5/01; C08G 69/40; C08G 69/44; C08G 2380/00
USPC ....................................................... 152/564
See application file for complete search history.

(56) References Cited

U.S. PATENT DOCUMENTS

| | | |
|---|---|---|
| 6,133,375 A | 10/2000 | Betremieux et al. |
| 2013/0206301 A1 | 8/2013 | Fudemoto et al. |
| 2013/0319592 A1 | 12/2013 | Harada et al. |

FOREIGN PATENT DOCUMENTS

| | | |
|---|---|---|
| JP | S63-156855 A | 6/1988 |
| JP | 2003-104008 A | 4/2003 |
| JP | 2012-46030 A | 3/2012 |
| JP | 2012-66809 A | 4/2012 |
| WO | 96/34048 A1 | 10/1996 |
| WO | 2012026547 A1 | 3/2012 |
| WO | 2012/111719 A1 | 8/2012 |

OTHER PUBLICATIONS

Extended European Search Report dated Mar. 7, 2016, issued in corresponding EP Patent Application.
Official Communication dated Mar. 7, 2018, issued in corresponding EP Patent Application EP 14774019.5.

*Primary Examiner* — Angela C Scott
(74) *Attorney, Agent, or Firm* — SOLARIS Intellectual Property Group, PLLC (57) ABSTRACT

A tire includes a round tire frame made of a resin material, and the resin material includes a thermoplastic polyamide-based elastomer including an ester bond within a molecule thereof. The thermoplastic polyamide-based elastomer has a ratio by mass (HS/SS) of hard segment (HS) to soft segment (SS) of from 54/46 to 90/10.

6 Claims, 4 Drawing Sheets

TIRE

TECHNICAL FIELD

The present invention relates to a tire for mounting on a rim, and, particularly, to a tire in which at least a part of the tire case thereof is made of a resin material.

BACKGROUND ART

Pneumatic tires made of rubber, organic fiber materials, steel members and the like have thus far been used in vehicles such as passenger cars. General rubber materials that have been used in conventional pneumatic tires do not have problems in terms of thermal resistance or the like. However, the production processes for such tires usually involve multiple processes such as kneading, seating, molding and vulcanization, and an increase in productivity has been requested.

In view of the above, in recent years, there have been an attempt to use resin materials, particularly, thermoplastic resins or thermoplastic elastomers, as tire materials, in consideration of their light weights and ease of molding and recycling. Pneumatic tires formed using thermoplastic polymer materials are disclosed, for example, in Patent Document 1 (Japanese Patent Application Laid-open (JP-A) No. 2003-104008) listed below. These thermoplastic polymer materials (thermoplastic resins) have many advantages in terms of an increase in productivity, for example, compatibility with injection molding.

Further, tires using thermoplastic polyamide-based elastomers as the thermoplastic polymer materials are also proposed (see Patent Document 2 (JP-A No. 2012-46030)).

PRIOR ART DOCUMENTS

Patent Document 1: JP-A No. 2003-104008
Patent Document 2: JP-A No. 2012-46030

SUMMARY OF INVENTION

Problem to be Solved by Invention

Tires in which thermoplastic polymer materials are used are easy to produce at low cost, as compared to conventional rubber tires. Tires in which thermoplastic polymer materials are used are required to be mountable on a rim, and to have excellent fittability to a rim so that the internal air does not leak out during mounting on a rim.

The present invention has been made in view of the foregoing circumstances, and aims to provide a tire that is formed using a resin material, and that has excellent fittability to a rim and a low rolling resistance.

Means for Solving the Problem

[1] A tire including a round tire frame made of a resin material, the resin material including a thermoplastic polyamide-based elastomer including an ester bond within a molecule thereof, and the thermoplastic polyamide-based elastomer having a ratio by mass (HS/SS) of hard segment (HS) to soft segment (SS) of from 54/46 to 90/10.

Advantageous Effect of Invention

According to the invention, a tire formed using a resin material and having excellent fittability to a rim and a low rolling resistance can be provided.

EMBODIMENTS FOR CARRYING OUT INVENTION

The tire according to the invention and includes a round tire frame made of a resin material, the resin material includes a thermoplastic polyamide-based elastomer including an ester bond in a molecule thereof, and the thermoplastic polyamide-based elastomer has a ratio (HS/SS) by mass of hard segment (HS) to soft segment (SS) of from 54/46 to 90/10.

The tire according to the invention is configured by allowing a tire frame in the invention to include a thermoplastic polyamide-based elastomer that includes an ester bond in a molecule thereof. Herein, the term "thermoplastic polyamide-based elastomer" refers to a thermoplastic resin material formed from a copolymer including a polymer forming a hard segment and a polymer forming a soft segment, the hard segment being crystalline and having a high melting point, the soft segment being amorphous and having a low glass transition temperature, and the polymer forming the hard segment having a main chain including an amide bond (—CONH—) therein. The thermoplastic polyamide-based elastomer may simply be referred to as a TPA (ThermoPlastic Amide elastomer). The thermoplastic polyamide-based elastomer has a ratio by mass (HS/SS; also simply referred to as the "HS mass ratio", hereinafter) of hard segment (HS) to soft segment (SS) of from 54/46 to 90/10, as a result of which the tendency for the internal air to leak out when the tire is mounted on a rim is lowered, and the tire has excellent fittability to a rim. Further, the tire frame of the tire according to the invention can be formed by injection molding, and, therefore, the tire can be manufactured with high productivity.

<<Resin Material>>

The tire includes a tire frame in which a resin material is used, as described above. The resin material at least has a HS mass ratio of from 54/46 to 90/10, and includes a thermoplastic polyamide-based elastomer including an ester bond (also simply referred to as the "thermoplastic polyamide-based elastomer according to the invention", hereinafter). The resin material may include a thermoplastic elastomer other than the thermoplastic polyamide-based elastomer, and/or other components. The content of the thermoplastic polyamide-based elastomer according to the invention to the total amount of the resin material is preferably 30% by mass or more, more preferably 50% by mass or more, and particularly preferably 70% by mass or more. In the present specification, the term "resin" encompasses thermoplastic resins as well as thermosetting resins, but does not include natural rubber.

(Thermoplastic Polyamide-based Elastomer)

As described above, the thermoplastic polyamide-based elastomer according to the invention may be a material at least having a structure in which a polyamide forms a hard segment that is crystalline and has a high melting point and another polymer (for example, a polyester, a polyether or the like) forms a soft segment that is amorphous and has a low glass transition temperature. In the thermoplastic polyamide-based elastomer, a chain extender, such as a dicarboxylic acid, may be used as a part connecting the hard segment and the soft segment.

Hard Segment

The polyamide resin for forming the hard segment may be, for example, a polyamide synthesized using a monomer represented by the following Formula (1) or (2).

$$H_2N-R^1-COOH \qquad \text{Formula (1)}$$

In Formula (1), $R^1$ represents a hydrocarbon molecular chain having from 2 to 20 carbon atoms, or an alkylene group having from 2 to 20 carbon atoms.

Formula (2)

In Formula (2), $R^2$ represents a hydrocarbon molecular chain having from 3 to 20 carbon atoms, or an alkylene group having from 3 to 20 carbon atoms.

In Formula (1), $R^1$ is preferably a hydrocarbon molecular chain having from 3 to 18 carbon atoms or an alkylene group having from 3 to 18 carbon atoms, more preferably a hydrocarbon molecular chain having from 4 to 15 carbon atoms or an alkylene group having from 4 to 15 carbon atoms, and particularly preferably a hydrocarbon molecular chain having from 10 to 15 carbon atoms or an alkylene group having from 10 to 15 carbon atoms. In Formula (2), $R^2$ is preferably a hydrocarbon molecular chain having from 3 to 18 carbon atoms or an alkylene group having from 3 to 18 carbon atoms, more preferably a hydrocarbon molecular chain having from 4 to 15 carbon atoms or an alkylene group having from 4 to 15 carbon atoms, and particularly preferably a hydrocarbon molecular chain having from 10 to 15 carbon atoms or an alkylene group having from 10 to 15 carbon atoms.

The monomer represented by Formula (1) or Formula (2) is, for example, an ω-aminocarboxylic acid or a lactam. The polyamide for forming the hard segment is, for example, a polycondensate of an ω-aminocarboxylic acid or a lactam, or a co-polycondensate of a diamine and a dicarboxylic acid.

Examples of the ω-aminocarboxylic acid include aliphatic ω-aminocarboxylic acids having from 5 to 20 carbon atoms, such as 6-aminocaproic acid, 7-aminoheptanoic acid, 8-aminooctanoic acid, 10-aminocapric acid, 11-aminoundecanoic acid, and 12-aminododecanoic acid. Examples of the lactam include aliphatic lactams having from 5 to 20 carbon atoms such as lauryllactam, ε-caprolactam, undecanelactam, ω-enantholactam, and 2-pyrrolidone.

Examples of the diamine include diamine compounds such as aliphatic diamines having from 2 to 20 carbon atoms, for example, ethylenediamine, trimethylenediamine, tetramethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylenediamine, 2,4,4-trimethylhexamethylenediamine, 3-methylpentamethylenediamine and metaxylenediamine. Dicarboxylic acids can be represented by $HOOC-(R^3)_m-COOH$ ($R^3$ representing a hydrocarbon molecular chain having from 3 to 20 carbon atoms, and m representing 0 or 1), and examples thereof include aliphatic dicarboxylic acids having from 2 to 22 carbon atoms, such as oxalic acid, succinic acid, glutaric acid, adipic acid, pimelic acid, suberic acid, azelaic acid, sebacic acid, and dodecanedioic acid.

Examples of the polyamide for forming the hard segment include a polyamide obtained by ring-opening polycondensation of ε-caprolactam (polyamide 6), a polyamide obtained by ring-opening polycondensation of undecanelactam (polyamide 11), a polyamide obtained by ring-opening polycondensation of lauryllactam (polyamide 12), a polyamide obtained by polycondensation of 12-aminododecanoic acid (polyamide 12), a polyamide obtained by polycondensation of a diamine and a dibasic acid (polyamide 66), and a polyamide including metaxylenediamine as a structural unit (amide MX).

The polyamide 6 described above can be represented by, for example, $\{CO-(CH_2)_5-NH\}_n$ (n representing the number of repeating units, which may be freely selected), and n is preferably from 2 to 100, and more preferably from 3 to 50.

The polyamide 11 described above can be represented by, for example, $\{CO-(CH_2)_{10}-NH\}_n$ (n representing the number of repeating units, which may be freely selected), and n is preferably from 2 to 100, and more preferably from 3 to 50.

The polyamide 12 described above can be represented by, for example, $\{CO-(CH_2)_{11}-NH\}_n$ (n representing the number of repeating units, which may be freely selected), and n is preferably from 2 to 100, and more preferably from 3 to 50.

The polyamide 66 described above can be represented by, for example, $\{CO(CH_2)_4CONH(CH_2)_6NH\}_n$ (n representing the number of repeating units, which may be freely selected), and n is preferably from 2 to 100, and more preferably from 3 to 50.

The amide MX including metaxylenediamine as a structural unit can be expressed, for example, as the following structural unit (A-1), wherein, in the structural unit (A-1), n represents the number of repeating units, which may be freely selected, and n is preferably from 2 to 100, and more preferably from 3 to 50.

(A-1)

The thermoplastic polyamide-based elastomer preferably includes a polyamide including a unit structure represented by $-[CO-(CH_2)_{11}-NH]-$ (polyamide 12) as a hard segment. As described above, the polyamide 12 can be obtained by ring-opening polycondensation of lauryllactam or polycondensation of 12-aminododecanoic acid, as described above.

—Soft Segment—

Examples of the polymer for forming the soft segment include polyesters and polyethers, and more specific examples include polyethylene glycol, polypropylene glycol, polytetramethylene ether glycol (PTMG), polyesters such as polyester polyols, and ABA-type triblock polyether diols. These polymers may be used singly, or in combination of two or more thereof. Further, polyether diamines obtainable by reacting ammonia or the like with a terminal of a polyether may be used, and, for example, an ABA-type triblock polyether diamine may be used.

Here, the "ABA-type triblock polyether diol" is, for example, a polyether represented by the following Formula (3).

Formula (3)

In Formula (3), each of x and z independently represents an integer from 1 to 20, and y represents an integer from 4 to 50.

In Formula (3), each of x and z is preferably an integer from 1 to 18, more preferably an integer from 1 to 16, and particularly preferably an integer from 1 to 14, and most preferably an integer from 1 to 12. In Formula (3), y is preferably an integer from 5 to 45, more preferably an integer from 6 to 40, particularly preferably an integer from 7 to 35, and most preferably an integer from 8 to 30.

The ABA-type triblock polyether diamine is, for example, a polyether diamine represented by the following Formula (N).

Formula (N)

In Formula (N), each of $X_N$ and $Z_N$ independently represents an integer from 1 to 20, and $Y_N$ represents an integer from 4 to 50.

In Formula (N), each of $X_N$ and $Z_N$ independently represents an integer from 1 to 18, more preferably an integer from 1 to 16, particularly preferably an integer from 1 to 14, and most preferably an integer from 1 to 12. In Formula (N), $Y_N$ is preferably an integer from 5 to 45, more preferably an integer from 6 to 40, particularly preferably an integer from 7 to 35, and most preferably an integer from 8 to 30.

The combination of the hard segment and the soft segment may be any combination of a hard segment selected from those described above and a soft segment selected from those described above. Among them, a combination of ring-opening polycondensate of lauryllactam and polyethylene glycol, a combination of a ring-opening polycondensate of lauryllactam and polypropylene glycol, a combination of a ring-opening polycondensate of lauryllactam and polytetramethylene ether glycol, a combination of a ring-opening polycondensate of lauryllactam and a ABA-type triblock polyether diol, a combination of a polycondensate of aminododecanoic acid and polyethylene glycol, a combination of a polycondensate of aminododecanoic acid and polypropylene glycol, a combination of a polycondensate of aminododecanoic acid and polytetramethylene ether glycol, and a combination of a polycondensate of aminododecanoic acid and an ABA-type triblock polyether diol, are preferable, and a combination of a ring-opening polycondensate of lauryllactam and an ABA-type triblock polyether diol, and a combination of a polycondensate of aminododecanoic acid and an ABA-type triblock polyether diol, are particularly preferable. The combination such as those described above is preferably selected such that the thermoplastic polyamide-based elastomer according to the invention includes an ester bond in a molecule thereof.

The polymer for forming the soft segment may include, as a monomer unit, a diamine such as a branched saturated diamine having from 6 to 22 carbon atoms, a branched alicyclic diamine having from 6 to 16 carbon atoms, or norbornane diamine. The branched saturated diamine having from 6 to 22 carbon atoms, the branched alicyclic diamine having from 6 to 16 carbon atoms, and the norbornane diamine may be used singly, or in combination of two or more thereof, and are preferably used in combination with the ABA-type triblock polyether diol described above.

Examples of the branched saturated diamine having from 6 to 22 carbon atoms include 2,2,4-trimethyl-1,6-hexanediamine, 2,4,4-trimethyl-1,6-hexanediamine, 1,2-diaminopropane, 1,3-diaminopentane, 2-methyl-1,5-diaminopentane and 2-methyl-1,8-diaminooctane.

Examples of the branched alicyclic diamine having from 6 to 16 carbon atoms include 5-amino-2,2,4-trimethyl-1-cyclopentane methyl amine and 5-amino-1,3,3-trimethylcyclohexane methyl amine. These diamines may be in either a cis-form or a trans-form, or may be a mixture of such isomers.

Examples of the norbornanediamine include 2,5-norbornane dimethylamine and 2,6-norbornane dimethylamine, and mixtures thereof.

The polymer for forming the soft segment may include, as a monomer unit, another diamine compound than those described above. Examples of another diamine compound include: aliphatic diamines such as ethylene diamine, trimethylene diamine, tetramethylene diamine, hexamethylene diamine, heptamethylene diamine, octamethylene diamine, nonamethylene diamine, decamethylene diamine, undecamethylene diamine, dodecamethylene diamine, 2,2,4-trimethyl hexamethylene diamine, 2,4,4-trimethyl hexamethylene diamine, and 3-methylpentane methylene diameine; alicyclic diamines such as bis(4-aminocyclohexyl)methane, bis(4-aminocyclohexyl)propane, 1,3-bisaminomethylcyclohexane, and 1,4-bisaminomethylcyclohexane; and aromatic diamines such as metaxylylene diamine and paraxylylene diamine.

These diamines may be used singly, or may be used by combining two or more thereof, as appropriate.

—Chain Extender—

As described above, the thermoplastic polyamide-based elastomer may be formed using a chain extender such as a dicarboxylic acid, in addition to the hard segment and the soft segment. As the dicarboxylic acid, for example, at least one selected from the group consisting of aliphatic dicarboxylic acids, alicyclic dicarboxylic acids, and aromatic dicarboxylic acids, or derivatives thereof, may be used.

Specific examples of the dicarboxylic acid include: straight-chain aliphatic dicarboxylic acids having from 2 to 25 carbon atoms such as adipic acid, decanedicarboxylic acid, oxalic acid, succininc acid, glutaric acid, pimelic acid, suberic acid, azelaic acid, sebacic acid and dodecanedioic acid; aliphatic dicarboxylic acids such as dimerized aliphatic dicarboxylic acids having from 14 to 48 carbon atoms obtained by dimerization of an unsaturated fatty acid obtained by fractional distillation of triglycerides, and hydrogenated products thereof; alicyclic dicarboxylic acids such as 1,4-cyclohexane dicarboxylic acid; and aromatic dicarboxylic acids such as terephthalic acid and isophthalic acid.

—Ester Bond—

The thermoplastic polyamide-based elastomer according to the invention includes an ester bond in a molecule thereof. The tire according to the invention has a lower rolling resistance due to the inclusion of an ester bond. The ester bond may be present in either the hard segment or the soft segment in the thermoplastic polyamide-based elastomer. A configuration may be employed in which a copolymer including a polyester, such as a polyesterpolyol, is used as the soft segment, or a configuration may be employed in which a diol compound having a hydroxyl group at both terminals thereof, such as polyethylene glycol, polypropylene glycol, polytetramethylene ether glycol (PTMG) or the ABA-type triblock polyether diol, is used as the soft segment, and in which a polycarboxylic acid (a dicarboxylic acid) is used as the chain extender, and which includes an ester bond in a structural unit derived from the polycondensate thereof. In view of the above, it is preferable that the thermoplastic polyamide-based elastomer according to the invention includes a diol compound as the soft segment and includes an ester bond derived from bonding between a hydroxyl group of the diol compound and a carboxyl group (in, for example, the hard segment or the chain extender). The diol compound is not particularly limited, and examples thereof include the glycols and the diols described above. Specific examples thereof include diol compounds having a hydroxyl group at both terminals, such as polyethylene glycol, polypropylene glycol, polytetramethylene ether glycol (PTMG) and the ABA-type triblock polyether diols represented by the Formula (3) described above. For example, ABA-type triblock polyether diols and PTMG may be used.

The amount of ester bonds generated by polymerization reactions between ingredients can be controlled by selecting the types and the addition amounts of the hard segment, the soft segment and the chain extender as the ingredients for forming the thermoplastic polyamide-based elastomer. For example, in a case in which a thermoplastic polyamide-based elastomer including the polyamide 12 as the hard segment is to be synthesized, the thermoplastic polyamide-based elastomer including an ester bond can be synthesized by performing a synthesis reaction using a lauryllactam (to be ring-open polycondensed) or 12-aminododecanoic acid as an ingredient of the hard segment, using a diol compound selected from PTG, PTMG or the ABA-type triblock polyether diol represented by Formula (3) as the ingredient of the soft segment, and using adipic acid or decane dicarboxylic acid as the chain extender.

(HS Mass Ratio)

The thermoplastic polyamide-based elastomer according to the invention has a ratio by mass (HS/SS) of the hard segment (HS) to the soft segment (SS) in the thermoplastic polyamide-based elastomer of from 54/46 to 90/10. When the HS mass ratio is lower than 54/46, the elasticity is low, the shape maintaining property is inferior, and the fittability to a rim deteriorates. When the HS mass ratio is higher than 90/10, the elasticity is high, the mounting on a rim cannot be performed well, and the fittability to a rim deteriorates. The HS mass ratio can be adjusted to be within a desired range by adjusting the addition amounts of the ingredient for forming the hard segment and the ingredient for forming the soft segment. The HS mass ratio can be measured using $^1$H-NMR. From the viewpoint of durability, the HS mass ratio is preferably from 54/46 to 88/12.

The contents of the hard segment and the soft segment in the thermoplastic polyamide-based elastomer is preferably set, as appropriate, such that the HS mass ratio falls within the above-described range.

When the chain extender is used, the content thereof is preferably set such that the amount of hydroxyl groups or amino groups in the monomer molecules for forming the soft segment is nearly equimolar to the amount of carboxyl groups in the chain extender molecules.

The contents of the hard segment, the soft segment, and the optional chain transfer agent in the thermoplastic polyamide-based elastomer is set, as appropriate, such that the HS mass ratio falls within the above-described range, and the contents can be adjusted to desired values by, for example, adjusting the addition amounts thereof.

—Molecular Weight—

In the invention, the weight average molecular weight of the thermoplastic polyamide-based elastomer contained in the resin material is not particularly limited, and is preferably from about 10,000 to about 400,000. The weight average molecular weight of the thermoplastic polyamide-based elastomer is preferably from 15,700 to 300,000, and more preferably from 22,000 to 200,000, from the viewpoint of further improving the fittability to a rim and improving the pressure resistance of the tire to the internal pressure. The weight average molecular weight of the thermoplastic polyamide-based elastomer can be measured using gel permeation chromatography (GPC), and a GPC (gel permeation chromatograph) such as HLC-8320GPC EcoSEC manufactured by Tosoh Corporation, can be used.

The number average molecular weight of the polymer (polyamide) for forming the hard segment is preferably from 300 to 15,000 from the viewpoint of melt moldability. The number average molecular weight of the polymer for forming the soft segment is preferably from 200 to 6000 from the viewpoints of toughness and flexibility at low temperatures.

The thermoplastic polyamide-based elastomer can by synthesized by copolymerizing the polymer for forming the hard segment and the polymer for forming the soft segment using known methods. For example, the thermoplastic polyamide-based elastomer can be obtained by polymerizing a monomer for forming the hard segment (for example, an w-aminocarboxylic acid such as 12-aminododecanoic acid or a lactam such as lauryllactam), a monomer for forming the soft segment (for example, the ABA-type triblock polyether diol), and a chain extender (for example, adipic acid or decane dicarboxylic acid) in a vessel. In particular, in the case of using an ω-aminocarboxylic acid as a monomer for forming the hard segment, the thermoplastic polyamide-based elastomer can be synthesized by performing melt polymerization at normal pressure, or melt polymerization at normal pressure in combination with a further melt polymerization at reduced pressure. In the case of using lactam as a monomer for forming the hard segment, an appropriate amount of water may be co-present, and the thermoplastic polyamide-based elastomer can be prepared using a method including melt polymerization at an increased pressure of from 0.1 to 5 MPa and subsequent melt polymerization at normal pressure and/or melt polymerization at reduced pressure. The synthesis reactions may be performed in either a batch manner or a continuous manner. In the synthesis reactions, a batch reaction pot, a single bath or multi bath continuous reaction apparatus, or a tubular continuous reaction apparatus may be used singly, or in an appropriate combination thereof.

In the preparation of the thermoplastic polyamide-based elastomer, the polymerization temperature is preferably from 150° C. to 300° C., and more preferably from 160° C. to 280° C. The polymerization time may be set, as appropriate, in relation to the weight average molecular weight of the thermoplastic polyamide-based elastomer to be synthesized and the polymerization temperature, and the polymerization time is, for example, preferably from 0.5 to 30 hours, and more preferably from 0.5 to 20 hours.

In the preparation of the thermoplastic polyamide-based elastomer, additives for controlling the molecular weight or stabilizing the melt viscosity at the molding processing may be added, as necessary, and examples of such additives include monoamines or diamines such as laurylamine, stearylamine hexamethylene diamine, and metaxylylene diamine, and monocarboxylic acids or dicarboxylic acids such as acetic acid, benzoic acid, stearic acid, adipic acid, sebacic acid or dodecanedioic acid. The additive may be selected, as appropriate, in relation to, for example, the molecular weight or viscosity of the thermoplastic polyamide-based elastomer to be obtained, as long as the effect according to the invention is not adversely affected.

In the preparation of the thermoplastic polyamide-based elastomer, a catalyst may be used, as necessary. Examples of the catalyst include a compound including at least one selected from the group consisting of P, Ti, Ge, Zn, Fe, Sn, Mn, Co, Zr, V, Ir, La, Ce, Li, Ca and Hf. Examples thereof include inorganic phosphorus compounds, organic titanium compounds, organic zirconium compounds, and organic tin compounds. More specifically, examples of the inorganic phosphorus compounds include phosphorus-containing acids such as phosphoric acid, pyrophosphoric acid, polyphosphoric acid, phosphorus acid, and hypophosphorus acid, alkali metal salts of phosphorus-containing acids, and alkaline earth metal salts of phosphorus-containing acids. Examples of the organic titanium compounds include titanium alkoxides such as titanium tetrabutoxide and titanium tetraisopropoxide. Examples of the organic zirconium compounds include zirconium alkoxides such as zirconium tetrabutoxide (which can be expressed as $Zr(OBu)_4$ or $Zr(OC_4H_8)_4$). Examples of the organic tin compounds include distannoxane compounds such as 1-hydroxy-3-isothiocyanate-1,1,3,3-tetrabutyldistannoxane, tin acetate, dibutyltin dilaurate and butyltin hydroxide oxide hydrate.

The amount of the catalyst to be added and the timing of the addition of the catalyst are not particularly limited, as long as conditions in which the desired product can quickly obtained are provided.

As the thermoplastic polyamide-based elastomer, for example, a combination of a ring-opening polycondensate of lauryllactam, polyethylene glycol, and adipic acid, a combination of a ring-opening polycondensate of lauryllactam, polypropylene glycol, and adipic acid, a combination of a ring-opening polycondensate of lauryllactam, polytetramethylene ether glycol, and adipic acid, a combination of a ring-opening polycondensate of lauryllactam, an ABA-type triblock polyether, and adipic acid, a combination of a ring-opening polycondensate of lauryllactam, polyethylene glycol, and decane dicarboxylic acid, a combination of a ring-opening polycondensate of lauryllactam, polypropylene glycol and decane dicarboxylic acid, a combination of a ring-opening polycondensate of lauryllactam, polytetramethylene ether glycol, and decane dicarboxylic acid, a combination of a ring-opening polycondensate of lauryllactam, an ABA-type triblock polyether, and decane dicarboxylic acid, a combination of a polycondensate of aminododecanoic acid, polyethylene glycol, and adipic acid, a combination of a polycondensate of aminododecanoic acid, polypropylene glycol, and adipic acid, a combination of a polycondensate of aminododecanoic acid, polytetramethylene ether glycol, and adipic acid, a combination of a polycondensate of aminododecanoic acid, an ABA-type triblock polyether, and adipic acid, a combination of a polycondensate of aminododecanoic acid, polyethylene glycol, and decane dicarboxylic acid, a combination of a polycondensate of aminododecanoic acid, polypropylene glycol, and decane dicarboxylic acid, a combination of a polycondensate of aminododecanoic acid, polytetramethylene ether glycol, and decane dicarboxylic acid, and a combination of a polycondensate of aminododecanoic acid, an ABA-type triblock polyether, and decane dicarboxylic acid are preferable, and a combination of a ring-opening polycondensate of lauryllactam, an ABA-type triblock polyether, and adipic acid, a combination of a polycondensate of aminododecanoic acid, an ABA-type triblock polyether, and adipic acid, a combination of a polycondensate of aminododecanoic acid, polytetramethylene ether glycol, and adipic acid, and a combination of a polycondensate of aminododecanoic acid, polytetramethylene ether glycol, and decane dicarboxylic acid are particularly preferable. As the thermoplastic polyamide-based elastomer, those obtainable by combining preferable embodiments for the combination of structural units, the ratio between the structural units, the molecular weight and the like, may be used.

The resin material optionally includes various additives such as rubber, various fillers (for example, silica, calcium carbonate, and clay), antiaging agents, oils, plasticizers, coloring agents, weather resistance imparting agents, and reinforcing agents, as desired. The contents of these additives in the resin material (tire frame) are not particularly limited, and the additives may be appropriately employed in a range in which the effect according to the invention is not impaired. In the case of adding other ingredients (such as additives) than resins to the resin material, the content of resin component in the resin material is preferably 50% by mass or more, and more preferably 90% by mass or more, with respect to the total amount of the resin material. The content of resin component in the resin material corresponds to the remaining part left after subtracting the total contents of additives from the total amount of the resin components.

(Properties of Resin Material)

Preferable properties of the resin material forming the tire frame are described below. In the tire frame in the invention, the resin material described above is employed.

The melting point (or softening point) of the resin material (tire frame) itself is usually from 100° C. to 350° C., and more preferably from about 100° C. to about 250° C. From the viewpoint of tire productivity, the melting point (or the softening point) of the resin material (tire frame) is preferably from about 120° C. to about 250° C., and more preferably from 120° C. to 200° C.

When a resin material having a melting point of from 120° C. to 250° C. is used, the adhesion strength between tire frame pieces is sufficient in a tire frame formed by adhering divided parts thereof (frame pieces) by fusing at a surrounding temperature in a range of from 120° C. to 250° C.

Therefore, the tire according to the invention has excellent durability at driving, such as excellent resistance to puncture and excellent resistance to abrasion. The heating temperature is preferably a temperature that is higher than the melting point (or the softening point) of the resin material forming the tire frame pieces by 10° C. to 150° C., and more preferably a temperature that is higher than the melting point (or the softening point) of the resin material forming the tire frame pieces by 10° C. to 100° C.

The resin material can be obtained by adding various additives, as necessary, and appropriately mixing the resultant using known methods (such as melt mixing). The resin material obtained by melt mixing may be used after being shaped into a pellet shape, if necessary.

The tensile strength at yield as defined in Japanese Industrial Standards (JIS) K7113 (1995) of the resin material (tire frame) itself is preferably 5 MPa or more, preferably from 5 MPa to 20 MPa, and still more preferably from 5 MPa to 17 MPa. When the tensile strength at yield of the resin material is 5 MPa or more, the tire can tolerate the deformation due to the load applied to the tire at running.

The tensile elongation at yield as defined in JIS K7113 (1995) of the resin material (tire frame) itself is preferably 10% or more, more preferably from 10% to 70%, and more preferably from 15% to 60%. When the tensile elongation at yield of the resin material is 10% or more, the elastic area is large, and the fittability to a rim can be improved.

The tensile elongation at break as defined in JIS K7113 (1995) of the resin material (tire frame) itself is preferably 50% or more, preferably 100% or more, still more preferably 150% or more, and particularly preferably 200% or more. When the tensile elongation at break of the resin material is 50% or more, the fittability to a rim is excellent, and the tire is resistant to breakage upon impact.

The deflection temperature under load as defined in ISO75-2 or ASTM D648 of the resin material (tire frame) itself (under a load of 0.45 MPa) is preferably 50° C. or higher, preferably from 50° C. to 150° C., and still more preferably from 50° C. to 130° C. When the deflection temperature under load of the resin material is 50° C. or higher, the deformation of the tire frame can be suppressed even in the case of performing vulcanization during production of a tire.

First Embodiment

A tire according to a first embodiment of the invention is described below with reference to drawings.

Figure 1A:
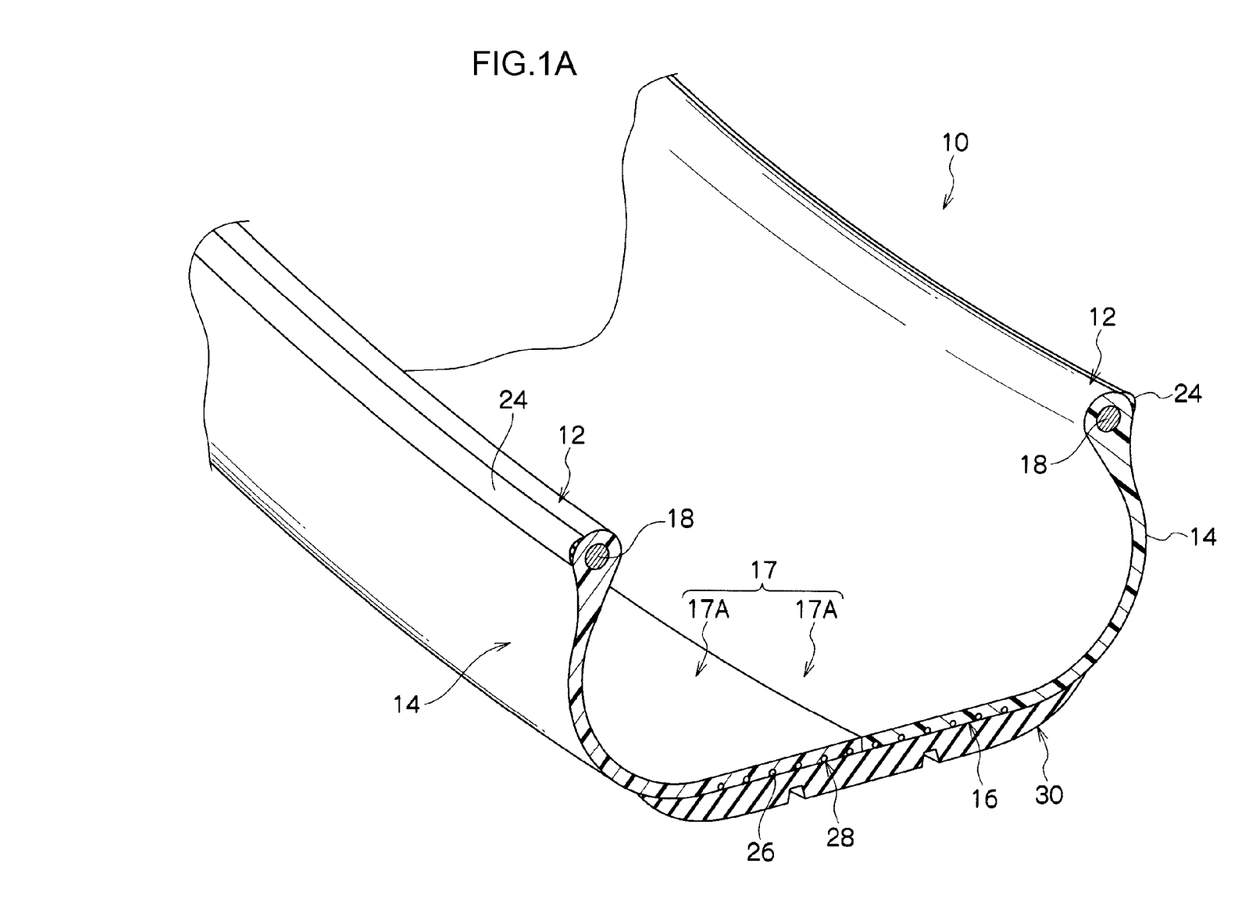
FIG. 1A is a perspective view illustrating a cross-section of a part of a tire according to an embodiment of the invention.
Figure 1B:
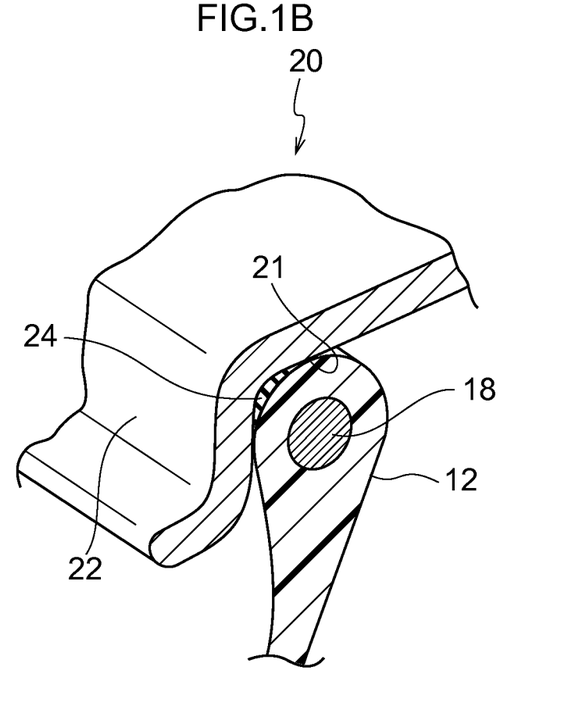
FIG. 1B is a cross-sectional view illustrating a bead portion fitted to a rim.

A tire 10 according to the present embodiment is described below. FIG. 1A is a perspective view illustrating a cross-section of a part of a tire according to an embodiment of the invention, and FIG. 1B is a cross-sectional view of a bead portion mounted on a rim. As illustrated in FIG. 1A, the tire 10 according to the present embodiment has a cross-sectional shape that is substantially similar to those of conventional general pneumatic rubber tires.

As illustrated in FIG. 1A, the tire 10 includes a tire case 17 that includes: a pair of bead portions 12 that will contact with a bead sheet 21 and a rim flange 22 of a rim 20 illustrated in FIG. 1B; side portions 14 that each outwardly extend from each bead portion 12 in the tire radial direction; and a crown portion 16 (outer circumferential portion) that connects the tire-radial-direction outermost end of one side portion 14 and the tire-radial-direction outermost end of the other side portion 14.

In the tire case 17 according to the present embodiment, for example, a thermoplastic polyamide-based elastomer including an ester bond and having an HS mass ratio of from 54/46 to 90/10 and further including various additives may be used as a resin material.

Although the tire case 17 is made of a single resin material in the present embodiment, the invention is not limited to this configuration, and thermoplastic resin materials having different properties may be used for the respective portions of the tire case 17 (such as the side portions 14, the crown portion 16 and the bead portions 12), in analogy with conventional general pneumatic rubber tires. Further, a reinforcing member (such as a polymer material, or a metal fiber, cord, non-woven fabric or woven fabric) may be embedded in the tire case 17 (for example, in the bead portions 12, the side portions 14, and/or the crown portion 16), so as to reinforce the tire case 17 with the reinforcing member.

The tire case 17 according to the present embodiment is a member obtained by joining together a pair of tire case half parts (tire frame pieces) 17A made of a resin material. The tire case half parts 17A are annular, have the same shape with each other, and each formed by, for example, injection molding of one bead portion 12, one side portion 14 and a half-width of the crown portion 16 as an integrated body. The tire case 17 is formed by disposing the tire case half parts 17A to face to each other, and joining them together at the tire equatorial plane. The tire case 17 is not limited to those obtained by joining together two pieces, and may be formed by joining together three or more pieces.

Each of the tire case half parts 17A made of a resin material may be shaped using, for example, vacuum molding, pressure forming, injection molding or melt casting. Therefore, vulcanization is unnecessary, the production process can greatly be simplified, and the forming time can be saved, as compared to the case of forming a tire case with rubber as in conventional techniques.

In the present embodiment, the tire case half parts 17A have a bilaterally symmetric shape, i.e., one of the tire case half parts 17A has the same shape as the other tire case half part 17A. Therefore, there is also an advantage in that only one type of mold is required for forming the tire case half parts 17A.

In the present embodiment, an annular bead core 18 made of a steel cord similar to those used in conventional general pneumatic tires is embedded in each of the bead portions 12, as illustrated in FIG. 1B. However, the invention is not limited to this configuration, and the bead core 18 may be omitted as long as it is ensured that the bead portion 12 has rigidity, and mounting on the rim 20 can be performed successfully. The bead core 18 may alternatively be made of an organic fiber cord, a resin-coated organic fiber cord, or a hard resin, instead of a steel cord.

In the present embodiment, an annular sealing layer 24 formed of a material having a higher sealing property than that of the resin material forming the tire case 17, for example rubber, is provided on a part of the bead portion 12 that contact the rim 20 or at least on a part of the bead portion 12 that contacts the rim flange 22 of the rim 20. The sealing layer 24 may also be provided in a part in which the tire case 17 (the bead portion 12) and the bead seat 21 contact each other. A material softer than the resin material that constitutes the tire case 17 may be used as the material having a higher sealing property than that of the resin material that constitutes the tire case 17. As a rubber usable for the sealing layer 24, a rubber similar to rubbers used on the outer surfaces of the bead portions of conventional general pneumatic rubber tires is preferably used. Another thermoplastic resin (thermoplastic elastomer) having a higher sealing property than that of the resin material described above may alternatively be used. Examples of another thermoplastic resin include resins such as polyurethane-based resins, polyolefin-based resins, thermoplastic polystyrene-based resins, and polyester resins, and blends of any of these resins with rubber or an elastomer. Thermoplastic elastomers are also usable, and examples thereof include thermoplastic polyester-based elastomers, thermoplastic polyurethane-based elastomers, thermoplastic polystyrene-based elastomers, thermoplastic polyolefin-based elastomers, and any combination of these elastomers, and blends of any of these elastomers with rubber.

As illustrated in FIG. 1A, a reinforcing cord 26 having higher rigidity than that of the resin material constituting the tire case 17 is wound around the crown portion 16 in the circumferential direction of the tire case 17. The reinforcing cord 26 is helically wound to form a reinforcing cord layer 28 in a state in which at least a part of the reinforcing cord 26 is embedded in the crown portion 16 in cross-sectional view taken along the axial direction of tire case 17. A crown 30 formed of a material, such as rubber, having higher abrasion resistance than that of the resin material constituting the tire case 17 is disposed at the tire-radial-direction outer circumferential side of the reinforcing cord layer 28.

Figure 2:
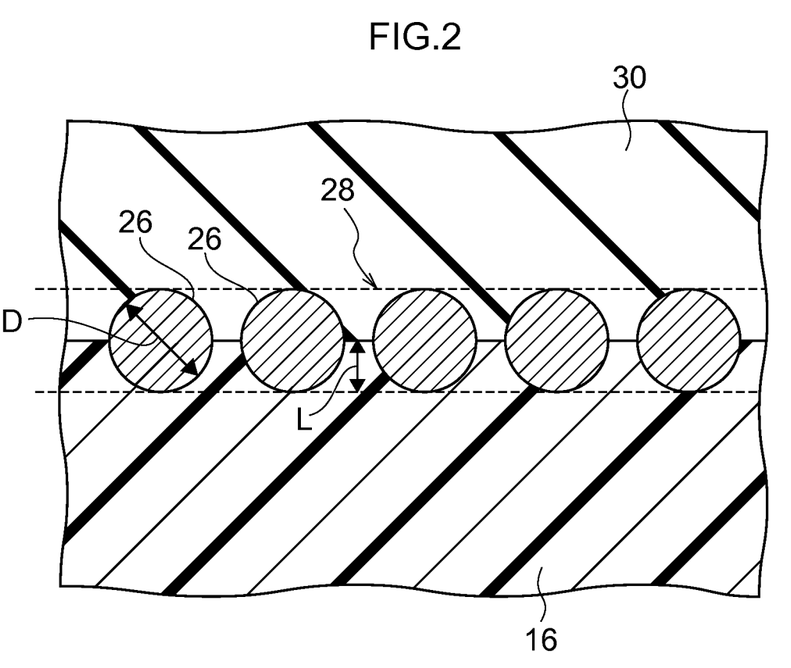
FIG. 2 is a cross-sectional view taken along a tire rotation axis, illustrating a state in which a reinforcing cord is embedded in a crown portion of the tire case of a tire according to the first embodiment.

The reinforcing cord layer 28 formed by the reinforcing cord 26 is described below with reference to FIG. 2. FIG. 2 is a cross-sectional view taken along the tire rotation axis, which illustrates a state in which the reinforcing cord is embedded in the crown portion of the tire case of the tire according to the first embodiment. As illustrated in FIG. 2, the reinforcing cord 26 is helically wound in a state in which at least a part of the reinforcing cord 26 is embedded in the crown portion 16 in a cross-sectional view taken along the axial direction of the tire case 17, and, together with a part of the outer circumferential portion of the tire case 17, forms the reinforcing cord layer 28 specified by the intermittent lines in FIG. 2. The part of the reinforcing cord 26 that is embedded in the crown portion 16 is in close contact with the resin material constituting the crown portion 16 (the tire case 17). A monofilament (single filament) of a metal fiber, an organic fiber, or the like, or a multifilament (stranded filament) in which fibers such as those described above are stranded, such as a steel cord composed of stranded steel fibers, may be used as the reinforcing cord 26. In the present embodiment, a steel cord is used as the reinforcing cord 26.

The depth L of embedding in FIG. 2 illustrates the depth of embedding of the reinforcing cord 26 in the tire case 17 (the crown portion 16) along the tire rotation axis direction. The depth L of embedding of the reinforcing cord 26 in the crown portion 16 is preferably equal to or greater than $1/5$ of the diameter D of the reinforcing cord 26, and more preferably more than $1/2$ of the diameter D of the reinforcing cord 26. It is most preferable for the entire reinforcing cord 26 to be embedded in the crown portion 16. When the depth L of embedding of the reinforcing cord 26 is more than $1/2$ of the diameter D of the reinforcing cord 26, the reinforcing cord 26 is less likely to drop off from the embedded portion due to the dimensions of the reinforcing cord 26. When the entire reinforcing cord 26 is embedded in the crown portion 16, the surface (the outer circumferential surface) becomes flat, whereby entry of air into an area around the reinforcing cord can be suppressed even when a member is placed on the crown portion 16 in which the reinforcing cord 26 is embedded. The reinforcing cord layer 28 corresponds to a belt disposed on the outer circumferential surface of a carcass of a conventional pneumatic rubber tire.

As described above, the crown 30 is disposed on the tire-radial-direction outer circumferential side of the reinforcing cord layer 28. It is preferable that the same type of rubber as that used for conventional pneumatic rubber tires is used as the rubber used for the crown 30. A crown formed of another type of resin material having higher abrasion resistance than that of the resin material constituting the tire case 17 may be used, in place of the crown 30. In the crown 30, a crown pattern composed of plural grooves is formed on the contact surface that comes into contact with a road surface, similarly to conventional pneumatic rubber tires.

A method of manufacturing a tire according to the present embodiment is described below.

Tire Case Forming Process

First, tire case half parts are formed using a resin material including the thermoplastic polyamide-based elastomer, as described above. The forming of the tire case is preferably performed by injection molding. Then, the tire case half parts are aligned to face each other while being supported by thin metal support rings. Subsequently, a jointing mold, not illustrated in the drawings, is placed so as to contact the outer circumferential surface of a portion at which the tire case half parts are contacted with each other. The jointing mold is configured to pressurize a region at or around the bonding area (the portion of the contact) of the tire case half parts 17A with a predetermined pressure. Then, the region at or around the bonding area of the tire case half parts is pressurized at a temperature equal to or higher than the melting point (or softening point) of the resin material that constitutes the tire case. When the bonding area of the tire case half parts is heated and pressurized by the jointing mold, the bonding area is melted, and the tire case half parts are fused with each other, as a result of which the members are integrated to form the tire case 17. Although the bonding area of the tire case half parts is heated using a jointing mold in the present embodiment, the invention is not limited to this configuration; the tire case half parts may be bonded together by heating of the bonding area using, for example, a separately provided high frequency heater, or by softening or melting the bonding area, in advance, via application of hot air, irradiation with infrared radiation, or the like, and pressurizing the bonding area using the jointing mold.

Reinforcing Cord Member Winding Process

Figure 3:
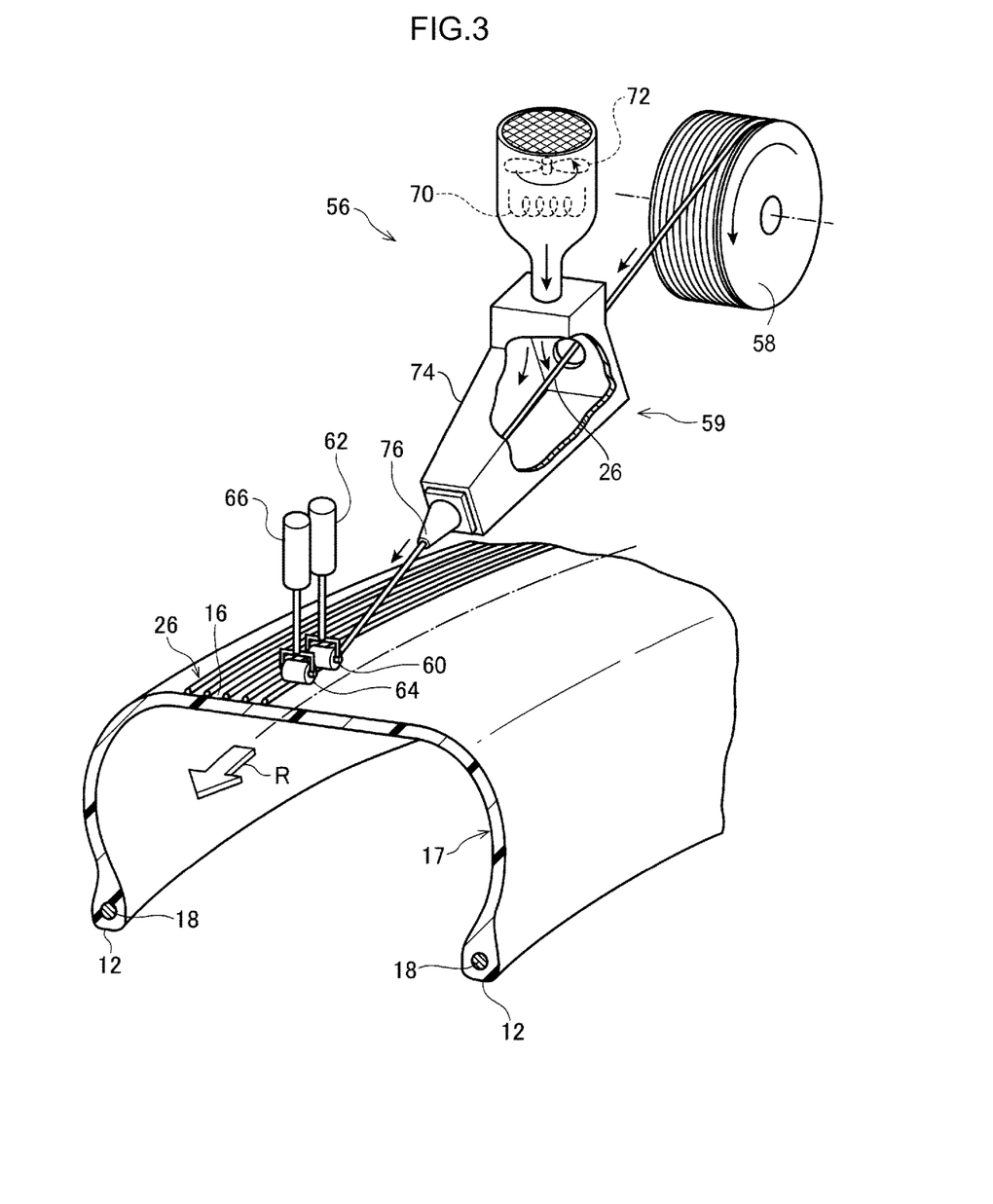
FIG. 3 is an explanatory view illustrating the operation of embedding a reinforcing cord in the crown portion of a tire case using a cord heating device and rollers.

Next, a reinforcing cord winding process is described with reference to FIG. 3. FIG. 3 is an explanatory diagram explaining an operation to embed the reinforcing cord in the crown portion of a tire case using a cord heating device and rollers. In FIG. 3, a cord feeding apparatus 56 includes: a reel 58 on which a reinforcing cord 26 is wound; a cord heating device 59 disposed at the downstream side in the cord conveying direction of the reel 58; a first roller 60 disposed at the downstream side in the reinforcing cord 26 conveying direction; a first cylinder device 62 for moving the first roller 60 in directions in which the first rollers comes into contact with and get away from the outer circumferential surface of tire; a second roller 64 disposed at the downstream side in the reinforcing cord 26 conveying direction of the first roller 60; and a second cylinder device 66 for moving the second roller 64 in directions in which the second roller comes into contact with and get away from the outer circumferential surface of the tire. The second roller 64 can be used as a cooling roller formed of metal. In the present embodiment, the surface of the first roller 60 or the second roller 64 is coated with a fluorine resin (TEFLON (registered trademark) in the case of the present embodiment) with a view to suppressing adhesion of the melted or softened resin material. Although the cord feeding apparatus 56 is configured to have two rollers of the first roller 60 and the second roller 64 in the present embodiment, the invention is not limited to this configuration, and the cord feeding apparatus may be configured to have only one of these rollers (that is, a single roller).

The cord heating device 59 includes a heater 70 and a fan 72 that generate hot air. The cord heating device 59 includes a heating box 74 into which hot air is supplied and in which the reinforcing cord 26 passes through the inside space thereof, and an discharge outlet 76 through which the heated reinforcing cord 26 is discharged.

In the present process, first, the temperature of the heater 70 of the cord heating device 59 is increased, and the air around the heater 70 heated by the heater 70 is sent to the heating box 74 by an air current generated by the rotation of the fan 72. Then, the reinforcing cord 26 drawn out from the reel 58 is fed to the inside of the heating box 74, of which the inner space is heated with hot air, whereby the reinforcing cord 26 is heated (for example, to increase the temperature of the reinforcing cord 26 to be approximately from 100° C. to 200° C.). The heated reinforcing cord 26 passes through the discharge outlet 76, and is helically wound, with a constant tension, around the outer circumferential surface of the crown portion 16 of the tire case 17 rotating in the direction of arrow R in FIG. 3. Here, as a result of the heated reinforcing cord 26 coming into contact with the outer circumferential surface of the crown portion 16, the resin material at the contact portion is melted or softened, and at least a part of the heated reinforcing cord 26 is embedded in the outer circumferential surface of the crown portion 16. In this process, since the heated reinforcing cord 26 is embedded in the melted or softened resin material, a state is achieved in which there are no gaps between the resin material and the reinforcing cord 26, namely a close contact state. Accordingly, the incorporation of air into the portion in which the reinforcing cord 26 is embedded is suppressed. By heating the reinforcing cord 26 to a temperature higher than the melting point or softening point of the resin material forming the tire case 17, the melting or softening of the resin material in the portion contacting the reinforcing cord 26 is promoted. By employing this configuration, embedding of the reinforcing cord 26 in the outer circumferential surface of the crown portion 16 is facilitated, and the incorporation of air can effectively be suppressed.

The depth L of embedding of the reinforcing cord 26 can be adjusted by the heating temperature for the reinforcing cord 26, the tension acting on the reinforcing cord 26, the pressure applied by the first roller 60, and the like. In the present embodiment, the depth L of embedding of the reinforcing cord 26 is set to be equal to or greater than $\frac{1}{5}$ of the diameter D of the reinforcing cord 26. The depth L of embedding of the reinforcing cord 26 is more preferably more than $\frac{1}{2}$ of the diameter D of the reinforcing cord 26, and it is most preferable that the entire reinforcing cord 26 is embedded.

In this way, a reinforcing cord layer 28 is formed on the outer circumferential side of the crown portion 16 of the tire case 17 by winding the heated reinforcing cord 26 on the outer circumferential surface of the crown portion 16 such that the heated reinforcing cord 26 is embedded in the outer circumferential surface of the crown portion 16.

Then, a belt-shaped vulcanized crown 30 is wound on the outer circumferential surface of the tire case 17 for one revolution, and the crown 30 is bonded to the outer circumferential surface of the tire case 17 using, for example, an adhesive. For example, precured crowns known thus far for use in retreaded tires may be used as the crown 30. The present process is a process similar to the process of bonding a precured crown to the outer circumferential surface of a casing of a retreaded tire.

A tire 10 can be completed by bonding a sealing layer 24 formed of a vulcanized rubber to the bead portion 12 of the tire case 17 using, for example, an adhesive.

Effects

In the tire 10 according to the present embodiment, the tire case 17 is formed of a resin material including a thermoplastic polyamide-based elastomer including an ester bond, and having an HS ratio of from 54/46 to 90/10. Due to this configuration, the tire 10 according to the invention has a low rolling resistance and an improved fittability to a rim. Moreover, since the tire 10 has a simpler structure than those of conventional rubber tires, the tire 10 has a light weight. Therefore, the tire 10 according to the present embodiment has high capacity to tolerate friction and has high durability. Further, since the tire case 17 can be formed by injection molding, the tire case 17 can be manufactured with excellent productivity.

In the tire 10 according to the present embodiment, the reinforcing cord 26 having a higher rigidity than that of the resin material is helically wound on the outer circumferential surface of the crown portion 16 of the tire case 17 formed of the resin material, around the circumferential direction. Due to this configuration, the puncture resistance, cut resistance, and rigidity in the circumferential direction of the tire 10 are improved. The improvement in the rigidity in the circumferential direction of the tire 10 prevents creep of the tire case 17 formed of the resin material.

In a cross-sectional view taken along the axial direction of the tire case 17 (the cross-section illustrated in FIG. 1), at least a part of the reinforcing cord 26 is embedded in the outer circumferential surface of the crown portion 16 of the tire case 17 formed of the resin material, and is in close contact with the resin material. Due to this configuration, incorporation of air during manufacture is suppressed, and movement of the reinforcing cord 26 due to, for example, a force exerted at the time of travelling is suppressed. Accordingly, separation or the like between the reinforcing cord 26, the tire case 17, and the crown 30 is suppressed from occurring, and the durability of the tire 10 is improved.

In a case in which the reinforcing cord layer 28 is configured to include the resin material as described above, the reinforcing cord 26 can be made to more tightly contact the tire case 17 or fixed to the tire case 17 since the difference in hardness between the tire case 17 and the reinforcing cord layer 28 can be made smaller than that in a case in which the reinforcing cord 26 is fixed using a cushion rubber. Accordingly, the incorporation of air described above can effectively be prevented, and the movement of the reinforcing cord member at the time of travelling can effectively be suppressed.

In a case in which the reinforcing cord 26 is a steel cord, the reinforcing cord 26 can easily be separated from the resin material by heating and recovered at the time of disposing of the tire, and, therefore, there is an advantage from the perspective of recyclability of the tire 10. Further, since the resin material has a lower loss coefficient (tan δ) than that of vulcanized rubber, inclusion of a large amount of the resin material in the reinforcing cord layer 28 makes it possible to enhance the rolling property of the tire. Compared with vulcanized rubber, the resin material has advantages in terms of high in-plane shear stiffness, excellent steering stability at the time of travelling with the tire, and excellent abrasion resistance.

As illustrated in FIG. 2, the depth L of embedding of the reinforcing cord 26 is set to be equal to or greater than ⅕ of the diameter D thereof. Therefore, the incorporation of air during manufacture is effectively suppressed, and movement of the reinforcing cord 26 due to, for example, a force exerted at the time of travelling is further suppressed.

Since the crown 30 that contacts the road surface is formed of a rubber material having higher abrasion resistance than that of the resin material forming the tire case 17, the abrasion resistance of the tire 10 is improved.

Since the annular bead core 18 formed of a metal material is embedded in the bead portion 12, the tire case 17 is strongly fixed to the rim 20, i.e., the tire 10 is strongly fixed to the rim 20, similarly to conventional pneumatic rubber tires.

In the tire case 17, a thermoplastic polyamide-based elastomer including an ester bond, and having an HS ratio of from 54/46 to 90/10 is used. Due to this configuration, the fittability of the tire 10 to the rim 20 can further be improved by providing the sealing layer 24 formed of a rubber material having higher sealing ability than that of the resin material constituting the tire case 17 is disposed in a region of the bead portion 12 that contacts the rim 20.

Although a configuration in which the reinforcing cord 26 is heated such that a portion of the surface of the tire case 17 that contacts the heated reinforcing cord 26 is melted and softened is adopted in the embodiment described above, the invention is not limited to this configuration; instead of heating the reinforcing cord 26, a hot airflow generation device may be used to heat the outer circumferential surface of the crown portion 16 in which the reinforcing cord 26 is to be embedded, and the reinforcing cord 26 may thereafter be embedded in the crown portion 16.

Although the heat source of the cord heating device 59 includes the heater and the fan in the first embodiment, the invention is not limited to this configuration, and a configuration in which the reinforcing cord 26 is directly heated by radiation heat (for example, infrared radiation) may be adopted.

Although a configuration in which a region at which the resin material with the reinforcing cord 26 embedded therein is melted or softened is forcibly cooled with the second roller 64 formed of metal is adopted in the first embodiment, the invention is not limited to this configuration; a configuration in which cold airflow is directly blown to the region at which the resin material is melted or softened, to forcibly cool and solidify the region at which the resin material is melted or softened may also be adopted.

Although a configuration in which the reinforcing cord 26 is heated is adopted in the first embodiment, a configuration in which the outer circumference of the reinforcing cord 26 is coated with the same resin material as that of the tire case 17, for example, may be adopted. In this case, by heating the coated resin material along with the reinforcing cord 26 at the time the coated reinforcing cord is wound on the crown portion 16 of the tire case 17, incorporation of air during embedding the reinforcing cord in the crown portion 16 can effectively be suppressed.

Helically winding the reinforcing cord 26 is easy from the viewpoint of manufacture. However, a method in which the reinforcing cord 26 is provided so as to be discontinuous in the width direction may also be contemplated.

The tire 10 according to the first embodiment is what is referred to as a tubeless tire, in which an air chamber is formed between the tire 10 and the rim 20 by fitting the bead portions 12 to the rim 20. However, the invention is not limited to this configuration, and a complete tube shape may be adopted. Further, the tire according to the invention may have a configuration in which a reinforcing cord member having a cord member coated with a resin material is used, as illustrated in the second embodiment (FIGS. 4 and 5) of JP-A No. 2012-46030.

Modes for practicing the invention are described above with reference to embodiments. However, these embodiments are examples, and may be practiced after subjected to various modifications, as long as the spirit of the invention is retained. Of course, the protection scope of the invention is by no means limited to these embodiments.

EXAMPLES

Hereinafter, the invention will be more specifically described with reference to examples. However, the invention is not limited thereto.

Comparative Example 1

—Synthesis of Polyamide—

17.75 kg of 12-aminododecanoic acid manufactured by ALDRICH and 0.25 kg of adipic acid manufactured by ALDRICH were charged into a 50 L pressure vessel equipped with a stirrer, a thermometer, a torque meter, a pressure meter, a nitrogen gas inlet, a pressure adjustment instrument, and a polymer removal port. Then, the gas inside the vessel was sufficiently replaced with nitrogen. Thereafter, while nitrogen gas was supplied thereto, the pressure inside the vessel was adjusted to 0.05 MPa, and the temperature was increased from room temperature to 240° C. Further, while the pressure inside the vessel was controlled at 0.05 MPa, polymerization was allowed to proceed at 240° C. for 4 hours (polymerization reaction A), whereby NYLON® 12 having carboxylic acid at both terminals (the polyamide 12 described above) was obtained.

—Synthesis of ABA-type Triblock Polyether Diol—

8.6 kg of TERATHANE650 manufactured by ALDRICH (polytetramethyleneglycol (PTMG)) and 50 g of potassium hydroxide were charged into a 50 L pressure vessel equipped with a stirrer, a thermometer, a pressure meter, a nitrogen gas inlet, a raw ingredient addition port, a pressure adjustment instrument, and a product removal port. Then, the gas inside the vessel was sufficiently replaced with nitrogen gas. Thereafter, while nitrogen gas was supplied at 100 ml/min, stirring was performed, and 9.9 kg of propylene oxide manufactured by ALDRICH was gradually added dropwise. Then, the valve at the nitrogen gas inlet was closed so as to stop the introduction of nitrogen gas, and the temperature was increased to 120° C. over about 3 hours, and a reaction was allowed to proceed at 120° C. for another 4 hours. Then, the reaction substances were cooled to room temperature, and the product was removed from the removal port disposed at the lower part of the vessel. A citric acid aqueous solution was added to the product for neutralization. The aqueous solution phase and the product phase were separated from each other, and the product phase was washed with water seven times. In this manner, an ABA triblock polyether diol was synthesized. The ABA-type triblock polyether diol obtained was a transparent, slightly yellowish, viscous liquid substance.

—Synthesis of Polyamide Elastomer—

16.38 kg of the NYLON 12 obtained above having carboxylic acid at both terminals and 1.62 kg of the ABA-type triblock polyether diol obtained above were charged into a 50 L pressure vessel equipped with a stirrer, a thermometer, a torque meter, a pressure meter, a nitrogen gas inlet, a pressure adjustment instrument, and a polymer removal port, the temperature was increased to 200° C., and stirring was started. 1.8 g of a catalyst ($Zr(O-C_4H_8)_4$) manufactured by ALDRICH was added thereto, and, thereafter, the inside of the vessel was heated to 260° C., and, further, the inside of the vessel was vacuumized using a vacuum pump. Stirring was performed for another 2 hours, thereby carrying out a polymerization reaction, and obtaining a polymer.

Examples 1 to 5

A polymer of each example was obtained in the same manner as in Comparative Example 1, except that the amounts of aminododecanoic acid and adipic acid in the synthesis of a polyamide were changed as indicated in Table 1 below, and that the amounts of the NYLON 12 and the ABA triblock polyether diol in the synthesis of a polyamide elastomer were changed as indicated in Table 1 below.

of the vessel was vacuumized using a vacuum pump. Stirring was performed for another 3 hours, thereby carrying out a polymerization reaction, and obtaining a polymer.

Examples 6 and 7 and Comparative Example 3

A polymer of each example or comparative example was obtained in the same manner as in Comparative Example 1, except that the amounts of lauryllactam, aminododecanoic acid and decane dicarboxylic acid in the synthesis of a polyamide were changed from those employed in Comparative Example 2 as indicated in Table 2 below, and that the amounts of the NYLON 12 (PA12), the PTMG and $Zr(O-C_4H_8)_4$ in the synthesis of a polyamide elastomer were changed from those employed in Comparative Example 2 as indicated in Table 1 below.

TABLE 1

| | Charged Amount | Example 1 | Example 2 | Example 3 | Example 4 | Example 5 |
|---|---|---|---|---|---|---|
| PA synthesis (kg) | Aminododecanoic Acid | 17.1 kg | 16.6 kg | 15.9 kg | 17.4 kg | 17.7 kg |
| | Adipic Acid | 0.9 kg | 1.4 kg | 2.1 g | 0.6 kg | 0.4 kg |
| | Sum Total | 18.0 kg | 18.0 kg | 18.0 kg | 18.0 kg | 18.0 kg |
| TPA synthesis (kg) | PA12 | 13.1 kg | 11.7 kg | 9.9 kg | 14.8 kg | 15.8 kg |
| | ABA-type TPEG | 4.9 kg | 6.3 kg | 8.1 kg | 3.2 kg | 2.2 kg |
| | Zr(Obu)$_4$ | 18 g | 18 g | 18 g | 18 g | 18 g |

* In Table 1, PA12 means the polyamide 12 (NYLON 12), ABA-type TPEG means the ABA-type triblock polyether diol, and Zr(Obu)$_4$ means $Zr(O-C_4H_8)_4$.

Comparative Example 2

—Synthesis of Polyamide—

19.47 kg of lauryllactam manufactured by ALDRICH, 0.69 kg of 12-aminododecanoic acid manufactured by ALDRICH, and 7.84 kg of decane dicarboxylic acid manufactured by ALDRICH were charged into a 50 L pressure vessel equipped with a stirrer, a thermometer, a torque meter, a pressure meter, a nitrogen gas inlet, a pressure adjustment instrument, and a polymer removal port. Then, the temperature inside the vessel was increased to 280° C., and stirring was carried out for 2 hours. Further, nitrogen gas was supplied, and polymerization was allowed to proceed at 280° C. for 2 hours, whereby NYLON® 12 having carboxylic acid at both terminals (the polyamide 12 described above) was obtained.

—Synthesis of Polyamide Elastomer—

7.31 kg of the NYLON 12 obtained above having carboxylic acid at both terminals and 10.69 kg of PTMG (weight average molecular weight: 650) manufactured by Wako Pure Chemical Industries Ltd. were charged into a 50 L pressure vessel equipped with a stirrer, a thermometer, a torque meter, a pressure meter, a nitrogen gas inlet, a pressure adjustment instrument, and a polymer removal port, the temperature was increased to 200° C., and stirring was started. 1.62 g of a catalyst ($Zn(O-C_4H_8)_4$) manufactured by ALDRICH was added thereto, and, thereafter, the inside of the vessel was heated to 260° C., and, further, the inside

TABLE 2

| | Charged Amount | Example 6 | Example 7 | Comparative Example 3 |
|---|---|---|---|---|
| PA synthesis (kg) | Lauryllactam | 12.0 kg | 15.0 kg | 16.0 kg |
| | Aminododecanoic Acid | 0.9 kg | 1.0 kg | 1.2 kg |
| | Decane Dicarboxylic Acid | 5.1 kg | 2.0 kg | 0.9 kg |
| TPA synthesis (kg) | PA12 | 10.8 kg | 14.6 kg | 15.8 kg |
| | PTMG | 7.2 kg | 3.4 kg | 2.2 kg |
| | Zr(Obu)$_4$ | $3.0 \times 10^{-4}$ kg | $5.1 \times 10^{-4}$ kg | $5.9 \times 10^{-4}$ kg |

* In Table 2, PA12 means the polyamide 12 (NYLON 12), PTMG means polytetramethylene ether glycol, and Zr(Obu)$_4$ means $Zr(O-C_4H_8)_4$.

Fittability to Rim

Tires were produced with reference to the first embodiment described above, using each of the polymers obtained in Examples and Comparative Examples. Then, each of the tires was mounted on a rim, and was checked with respect to whether or not the tire could be mounted on a rim and whether or not air leakage occurred. Evaluations were carried out such that tires that could be mounted on a rim, and exhibited no air leakage were ranked "A", and such that tires that could not be mounted on a rim or exhibited air leakage were ranked "C".

TABLE 3

|  | Example 1 | Example 2 | Example 3 | Example 4 | Example 5 | Comparative Example 1 | Comparative Example 2 | Example 6 | Example 7 | Example 8 |
|---|---|---|---|---|---|---|---|---|---|---|
| Hard Segment Structure | | | | | PA12 | | | | | |
| Soft Segment Structure | | | HO-PPG-PTMG-PPG-OH | | | | | PTMG | | |
| Dicarboxylic Acid | | | C4 (adipic acid) | | | | | C10 (1,10-decane dicarboxylic acid) | | |
| HS Mass Ratio | 54/46 | 65/35 | 73/27 | 82/18 | 88/12 | 91/9 | 41/59 | 57/43 | 81/19 | 91/9 |
| Fittability to Rim | A | A | A | A | A | C | C | A | A | C |

In Table 3, PPG means that the moiety is formed from polypropylene glycol, and PTMG means that the moiety is formed from polytetramethylene ether glycol.

As is understood from Table 3, Comparative Examples in which the HS mass ratio of the thermoplastic polyamide-based elastomer contained in the tire case is outside the range of 54/46 to 90/10 exhibited inferior fittability to a rim, as compared to Examples.

Comparative Example 4

11.24 kg of 12-aminododecanoic acid, 3.21 kg of an ABA-type triblock polyether diamine (XTJ-542 manufactured by HUNTSMAN), and 0.67 kg of adipic acid were charged into a 50 L pressure vessel equipped with a stirrer, a thermometer, a torque meter, a pressure meter, a nitrogen gas inlet, a pressure adjustment instrument, and a polymer removal port. Then, the gas inside the pressure vessel was sufficiently replaced with nitrogen. Thereafter, while nitrogen gas was supplied, the pressure inside the pressure vessel was adjusted to 0.05 MPa, and the temperature was increased from room temperature to 240° C. Polymerization was performed at 240° C. for 2 hours while the pressure inside the pressure vessel was controlled at 0.05 MPa.

Rolling Resistance

Tires were prepared with reference to the first embodiment described above, using each of the polymers obtained in Example 4, Example 7 and Comparative Example 4. Each of the tires was mounted on a standard rim, and the internal pressure was adjusted to 230 kPa. Thereafter, the rolling resistance force of the axle was obtained using a drum tester having a metal plate surface at a velocity of 80 km/h. The measurement of the rolling resistance was performed according to the Japanese Industrial Standards (JIS) D4234, using the smooth drum force equation.

TABLE 4

|  | Example 4 | Example 7 | Comparative Example 4 |
|---|---|---|---|
| Hard Segment Structure | | PA12 | |
| Soft Segment Structure | A | B | C |
| Dicarboxylic Acid | Adipic Acid | Decane Dicarboxylic Acid | Adipic Acid |
| Hard Segment Ratio | 82/18 | 82/18 | 82/18 |
| Rolling Resistance Coefficient | 95 | 83 | 100 |

* In Table 4, A represents HO-PPG-PTMG-PPG-OH, B represents PTMG, and C represents H₂N-PPG-PTMG-PPG-NH₂.

Table 4 demonstrates that Comparative Example 4, in which a thermoplastic polyamide-based elastomer not including an ester bond in a molecule thereof was used, exhibited a greater coefficient of tire rolling resistance, as compared to Examples, in which thermoplastic polyamide-based elastomers including an ester bond in a molecule thereof is used.

The disclosure of Japanese Patent Application No. 2013-074297 is incorporated herein by reference.

The invention claimed is:

1. A tire comprising a round tire frame made of a resin material, the resin material including a thermoplastic polyamide-based elastomer including an ester bond within a molecule thereof, and the thermoplastic polyamide-based elastomer including a hard segment and a soft segment, and having a ratio by mass (HS/SS) of the hard segment (HS) to the soft segment (SS) of from 54/46 to 88/12,
   the hard segment (HS) including a polyamide 12 represented by —[CO—(CH$_2$)$_{11}$—NH],
   the soft segment (SS) being formed from a diol compound having a hydroxyl group at both terminals thereof,
   wherein a chain extender, which is a dicarboxylic acid selected from the group consisting of adipic acid and decanedicarboxylic acid, connects the hard segment and the soft segment, and
   the ester bond is formed between a hydroxyl group of the diol compound and a carboxyl group of the dicarboxylic acid.

2. The tire according to claim 1, wherein the diol compound comprises polytetramethylene ether glycol.

3. The tire according to claim 2, wherein the dicarboxylic acid is decanedicarboxylic acid.

4. The tire according to claim 1, wherein the polyamide 12 is a polyamide obtained by ring-opening polycondensation of lauryllactam or a polyamide obtained by polycondensation of 12-aminododecanoic acid.

5. The tire according to claim 1, wherein the diol compound is an ABA-type triblock polyether diol represented by Formula (3):

Formula (3)

wherein, in Formula (3), each of x and z independently represents an integer from 1 to 20, and y represents an integer from 4 to 50.

6. The tire according to claim 1, wherein the dicarboxylic acid is decanedicarboxylic acid.

* * * * *